United States Patent [19]

van Doorn et al.

[11] Patent Number: 5,030,712
[45] Date of Patent: Jul. 9, 1991

[54] POLYMERIZATION OF CO/OLEFIN WITH ARYL PHOSPHINE SULFIDE

[75] Inventors: Johannes A. van Doorn; Eit Drent; Leonard E. H. Gerards, all of Amsterdam, Netherlands

[73] Assignee: Shell Oil Company, Houston, Tex.

[21] Appl. No.: 432,826

[22] Filed: Nov. 7, 1989

[30] Foreign Application Priority Data

Nov. 11, 1988 [NL] Netherlands .......................... 8802772

[51] Int. Cl.$^5$ .............................................. C08G 67/02
[52] U.S. Cl. .................................... 528/392; 502/162; 502/168
[58] Field of Search .......................................... 528/392

[56] References Cited

U.S. PATENT DOCUMENTS 4,855,399  8/1989  Van Doorn et al. ............... 528/392

Primary Examiner—Harold D. Anderson

[57] ABSTRACT

An improved process for the production of linear alternating polymers of carbon monoxide and at least one ethylenically unsaturated hydrocarbon comprises contacting the carbon monoxide and hydrocarbon under polymerization conditions in the presence of a catalyst composition formed from a palladium compound, an anion of a strong non-hydrohalogenic acid and an aryl phosphine sulfide having at least 2 phosphorus atoms.

14 Claims, No Drawings

POLYMERIZATION OF CO/OLEFIN WITH ARYL PHOSPHINE SULFIDE

FIELD OF THE INVENTION

This invention relates to an improved process for the production of linear alternating polymers of carbon monoxide and at least one ethylenically unsaturated hydrocarbon. More particularly, the invention relates to the production of the linear alternating polymers in the presence of a catalyst composition formed from, inter alia, an aryl phosphine sulfide of at least two phosphorus atoms.

BACKGROUND OF THE INVENTION

The class of polymers of carbon monoxide and olefin(s) is well known in the art. Brubaker, U.S. Pat. No. 2,495,286, produced such polymers of relatively low carbon monoxide content in the presence of free radical initiators, e.g., peroxy compounds. U.K. No. 1,081,304 discloses the production of similar polymers of higher carbon monoxide content in the presence of alkylphosphine complexes of palladium compounds as catalyst. Nozaki extended the process to produce linear alternating polymers in the presence of arylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon, now becoming known as polyketones or polyketone polymers, has become of greater interest in part because of the greater availability of the polymers. The more recent general processes for the production of the polyketone polymers are illustrated by a number of published European Patent Applications including Nos. 121,965, 181,014, 213,671 and 257,663. The processes typically involve the use of a catalyst formed from a compound of palladium, cobalt or nickel, the anion of a strong non-hydrohalogenic acid and a bidentate ligand of phosphorus, arsenic or antimony. The resulting polymers are rather high molecular weight materials having established utility as premium thermoplastics. The polymers find usage in the production of shaped articles such as containers for food and drink which are produced by processing the polyketone polymers by procedures which are conventional for thermoplastics.

In a preferred modification of the process for the production of the linear alternating polymers, the catalyst composition is formed from a compound of palladium, the anion of a non-hydrohalogenic acid having a pKa below 6 and a bidentate ligand of phosphorus. These catalyst compositions are very active and provide good yields of polymer in reasonable reaction times. However, a disadvantage of the catalyst composition results from the bidentate ligand of phosphorus, i.e., a tetraaryl diphosphine, being highly sensitive to the presence of oxygen. When oxygen is present, the disphosphine ligand will oxidize to the diphosphine oxide and the catalyst composition will lose catalytic activity. Since only small amounts of diphosphine are present, even small amounts of oxygen can cause difficulty. The oxidation of the diphosphine ligand can be avoided, of course, by ensuring that oxygen does not enter the reaction zone. It would be of advantage, however, to provide a catalyst composition which exhibits acceptable activity and yet is not sensitive to the presence of small amounts of oxygen.

SUMMARY OF THE INVENTION

The present invention provides an improved method for the production of linear alternating polymers of carbon monoxide and at least one ethylenically unsaturated hydrocarbon. More particularly, the present invention provides an improved process for the production of the linear alternating polymers in the presence of a catalyst composition formed from, among other components, an aryl phosphine sulfide of at least two phosphorus atoms. The catalyst composition employed in the improved process of the invention provides an acceptable rate of polymer production without being sensitive to any trace amounts of oxygen that might enter the reaction zone.

DESCRIPTION OF THE INVENTION

The polyketone polymers which are produced by the improved process of the invention are linear alternating polymers of carbon monoxide and at least one ethylenically unsaturated hydrocarbon and contain substantially one molecule of carbon monoxide for each molecule of ethylenically unsaturated hydrocarbon. Suitable unsaturated hydrocarbons for use as precursors of the polyketone polymers have up to 20 carbon atoms inclusive, preferably up to 10 carbon atoms inclusive, and are aliphatic such as ethylene and other alpha-olefins including propylene, 1-butene, isobutylene, 1-hexene, 1-octene and 1-dodecane, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred terpolymers are produced by the process of the invention, there will be at least about 2 units containing a moiety of ethylene for each unit containing a moiety of the second hydrocarbon. Preferably there will be from about 10 to about 100 units incorporating a moiety of ethylene for each unit incorporating a moiety of the second hydrocarbon. The polymer chain of the preferred polyketone polymers is therefore represented by the repeating formula

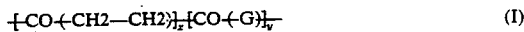 (I)

wherein G is the moiety of an ethylenically unsaturated hydrocarbon of at least 3 carbon atoms polymerized through the ethylenic unsaturation thereof and the ratio of y:x is no more than about 0.5. When copolymers of carbon monoxide and ethylene are produced by the process of the invention there will be no second hydrocarbon present and the copolymers are represented by the above formula I wherein y is zero. When terpolymers are produced, y will be greater than zero and preferred ratios of y:x will be from about 0.01 to about 0.1 with the $-CO \pm CH_2CH_2 \pm$ units and the $-CO \pm G \pm$ units being found randomly throughout the polymer. The end groups or "caps" of the polymer chain will depend upon what groups were present during the production of the polymer and whether or how the polymer was purified. The precise nature of the end groups do not appear to affect the properties of the polymers to any considerable extent so that the polymer is fairly represented by the polymer chain as depicted above.

Of particular interest are the polyketone polymers of number average molecular weight of from about 1000 to about 200,000, particularly those polymers of number average molecular weight from about 20,000 to about 90,000 as determined by gel permeation chromatography. The physical properties of the polymers will depend in part upon the molecular weight, whether the polymer is a copolymer or a terpolymer and, in the case of terpolymers, the nature of and the proportion of the second hydrocarbon present. Typical melting points of the polymers are from about 175° C. to about 300° C. but more often are from about 210° C. to about 270° C. The polymers will have a limiting viscosity number (LVN), measured in a standard capillary viscosity measuring device in m-cresol at 60° C., of from about 0.5 dl/g to about 10 dl/g, preferably from about 0.8 dl/g to about 4 dl/g.

The polyketone polymers are produced according to the process of the invention by contacting the carbon monoxide and hydrocarbon reactants under polymerization conditions in the presence of a reaction diluent and a catalyst composition formed from a palladium compound, an anion of a non-hydrohalogenic acid having a pKa (measured in water at 18° C.) of below about 4 and preferably below 2, and an aryl phosphine sulfide ligand having at least two phosphorus atoms. The palladium compound is a palladium carboxylate and compounds such as palladium acetate, palladium propionate, palladium hexanoate and palladium octanoate are satisfactory. The use of palladium acetate as the palladium compound catalyst precursor of the catalyst composition is preferred. The anion to be provided to the catalyst composition solution is suitably the anion of an inorganic acid such as sulfuric acid or perchloric acid or of an organic acid including carboxylic acids such as trifluoroacetic acid, trichloroacetic acid or dichloroacetic acid as well as sulfonic acids such as methanesulfonic acid, p-toluenesulfonic acid or trifluoromethanesulfonic acid. The anions of trifluoroacetic acid and p-toluenesulfonic acid are a preferred class of anions to be employed in the formation of the catalyst composition. The anion is preferably provided as the free acid but in an alternate embodiment the anion is provided as a metal salt, e.g., a non-noble transition metal salt such as a copper salt. In yet another embodiment the anion and the palladium are provided as a single compound, e.g., palladium trifluoroacetate.

The aryl phosphine sulfide contains from 2 to 3 phosphorus atoms inclusive, each of which is substituted by two aryl substituents and at least two of which is bonded to sulfur. One class of such aryl phosphine sulfides is represented by the formula

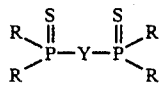

wherein R independently is aryl of up to 10 carbon atoms inclusive and Y is a divalent linking group of up to 10 carbon atoms inclusive with from 1 to 4 atoms in the bridge. R is hydrocarbyl containing only atoms of carbon and hydrogen or R is substituted hydrocarbyl containing additional atoms in the form of polar ring substituents, at least one of which is preferably located on a ring carbon atom ortho to the carbon atom connecting the R group to the phosphorus. Illustrative of suitable R groups are phenyl, naphthyl, tolyl, 2-methoxyphenyl, 4-ethoxyphenyl, 4-chlorophenyl and 2,4-dimethoxyphenyl. The preferred R groups are hydrocarbyl groups of one aromatic ring and particularly preferred is phenyl. The R' group is hydrocarbyl or non-hydrocarbyl containing up to 2 additional atoms which atoms are present as monovalent substituents or as part of the phosphorusphosphorus bridge. Illustrative of suitable R' groups are methylene, 1,2-ethylene, 1,3-propylene, 2,2-dimethyl-1,3-propylene, 1,3-(2,2-dimethyl)-2-silapropylene and 2-methyl-2-diphenylphosphinomethyl)-1,3-propylene. The aryl phosphine sulfides that are useful as catalyst composition precursors include 1,2-bis(diphenylphosphino)ethane disulfide, 1,3-bis(diphenylphosphino)propane disulfide, 2,2-bis(diphenylphosphino)propane disulfide 2-methyl-2-(diphenylphosphinomethyl)-1,3-bis(dimethylphosphino)propane disulfide and 2-methyl-2-(diphenylphosphinomethyl)-1,3-bis(diphenylphosphino)-propane trisulfide.

The quantity of anion to be employed is from about 1 mol to about 1000 mols of anion per mol of palladium compound but preferably is from about 2 mols to about 100 mols per mol of palladium. The aryl phosphine sulfide is provided in quantities within the same ranges, relative to the palladium. Sufficient catalyst composition should be utilized to provide from about $1 \times 10^{-7}$ mol to about $1 \times 10^{-3}$ mol of palladium per mol of ethylenically unsaturated hydrocarbon to be polymerized but preferably from about $1 \times 10^{-6}$ mol to about $1 \times 10^{-4}$ mol of palladium per mol of unsaturated hydrocarbon. The molar ratio of ethylenically unsaturated hydrocarbon to carbon monoxide should be from about 10:1 to about 1:5 but ratios from about 5:1 to about 1:2 are more frequently employed.

It is useful on occasion to employ as an additional catalyst composition component an organic oxidant in order to enhance the activity of the catalyst. Aliphatic nitrite compounds, aromatic nitro compounds and quinones, both 1,2-quinones and 1,4-quinones are useful for this purpose. The preferred oxidants are the quinones, e.g., benzoquinones, naphthoquinones and anthraquinones. Particularly preferred is 1,4-benzoquinone. The presence of organic oxidant is not required but amounts up to 10,000 mols per mol of palladium are suitable, particularly amounts up to 5000 mols per mol of palladium.

The contacting of the carbon monoxide and the hydrocarbon monomers with the catalyst composition is conducted under polymerization conditions in the presence of a reaction diluent. Alkanol diluents are suitable and preferred as the reaction diluent is methanol. Typical polymerization conditions include a reaction temperature of from about 25° C. to about 150° C. but preferably a reaction temperature of from about 30° C. to about 130° C. Reaction pressures are customarily from about 2 bar to about 150 bar but pressures from about 5 bar to about 100 bar are more frequently encountered. The contacting of the reactants and catalyst composition is conducted in a suitable reactor by conventional methods such as shaking or stirring. Subsequent to polymerization the reaction is terminated as by cooling and releasing the pressure. The polymer product is customarily obtained as a material substantially insoluble in the reaction medium and is recovered by well known techniques such as filtration or decantation. The polymer is used as recovered or is purified as by contact with a solvent or extraction agent selective for catalyst residues.

The polyketone polymer is thermoplastic and is processed by procedures conventional for thermoplastics, e.g., extrusion, injection molding or thermoforming, into a variety of shaped objects of established utility such as films useful in packaging and containers for food and drink.

The invention is further illustrated by the following Illustrative Embodiments which should not be construed to limit the invention. The copolymer product in each embodiment was examined by $^{13}$C-NMR and found to be a linear alternating polymer of $-CO+C_2H_4+$ units.

Illustrative Embodiment I

A copolymer of carbon monoxide and ethylene was produced by charging to an autoclave of 250 ml capacity equipped with a mechanical stirrer a catalyst composition solution comprising 50 ml methanol, 0.1 mmol palladium acetate, 0.3 mmol p-toluenesulfonic acid, 2 mmol bis(diphenylphosphino)methane disulfide and 20 mmol 1,4-benzoquinone. The air in the autoclave was removed by evacuation and ethylene was introduced until a pressure of 20 bar was reached and carbon monoxide was added until a pressure of 50 bar was reached. The autoclave and contents were then heated to 80° C. After 2.5 hours, reaction was terminated by cooling the autoclave and contents to room temperature and releasing the pressure. The polymer product was recovered by filtration, washed with methanol and dried in vacuo at room temperature. The yield of polymer was 2.3 g.

Illustrative Embodiment II

A carbon monoxide/ethylene copolymer was produced by a procedure substantially similar to that of Illustrative Embodiment I except that the disulfide provided to the catalyst composition solution was 1 mmol of 1,2-bis(diphenylphosphino)ethane disulfide and the reaction time was 5 hours instead of 2.5 hours. The yield of copolymer was 2.5 g.

Illustrative Embodiment III

A carbon monoxide/ethylene copolymer was produced by a procedure substantially similar to that of Illustrative Embodiment I except that the sulfide provided to the catalyst composition solution was 1 mmol of 2-methyl-2-(diphenylphosphinomethyl-1,3-bis(diphenylphosphino)propane trisulfide and the reaction time was 5 hours instead of 2.5 hours. The yield of copolymer was 7.2 g.

Illustrative Embodiment IV

A copolymer of carbon monoxide and ethylene was produced by a procedure substantially similar to that of Illustrative Embodiment III except that the quantity of trisulfide provided was 0.5 mmol instead of 1 mmol and the reaction temperature was 60° C. instead of 80° C. The yield of copolymer was 12.2 g.

Illustrative Embodiment V

A carbon monoxide/ethylene copolymer was produced by a procedure substantially similar to that of Illustrative Embodiment I except that the disulfide provided was 0.5 mmol of 2,2-bis(diphenylphosphino)propane disulfide and the reaction time was 5 hours. The yield of copolymer was 4.8 g.

Illustrative Embodiment VI

A copolymer of carbon monoxide and ethylene was produced by a procedure substantially similar to that of Illustrative Embodiment I except that the disulfide provided was 2,2-dimethyl-1,3-bis(diphenylphosphino)-2-silapropane disulfide and the reaction time was 5 hours. The yield of copolymer was 3.6 g.

What is claimed is:

1. A process for producing a linear alternating polymer of carbon monoxide and at least one ethylenically unsaturated hydrocarbon by contacting the carbon monoxide and hydrocarbon under polymerization conditions in the presence of a catalyst composition formed from a palladium compound, the anion of a non-hydrohalogenic acid having a pKa below about 4 and a bidentate phosphorus ligand, wherein the phosphorus ligand is an aryl phosphine sulfide of from 2 to 3 phosphorus atoms inclusive, each of which is substituted with two aryl substituents and at least two of which are bonded to sulfur.

2. The process of claim 1 wherein the aryl phosphine sulfide is represented by the formula

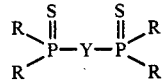

wherein R independently is aryl of up to 10 carbon atoms and Y is a divalent linking group of up to 10 carbon atoms and up to 2 additional atoms with from 1 to 4 atoms in the bridge.

3. The process of claim 2 wherein each R is phenyl.
4. The process of claim 3 wherein Y is 1,3-propylene.
5. The process of claim 3 wherein Y is 1,2-ethylene.
6. The process of claim 3 wherein Y is 2,2-propylene.
7. The process of claim 3 wherein Y is 1,3-(2,2-dimethyl-2-silapropene).
8. In the process of producing linear alternating copolymer of carbon monoxide and ethylene by contacting the carbon monoxide and ethylene in the presence of a catalyst composition formed from palladium acetate, an anion of trifluoroacetic acid or p-toluenesulfonic acid and a bidentate phosphorus ligand, the improvement wherein the bidentate ligand is an aryl phosphine sulfide of from 2 to 3 phosphorus atoms, each of which are substituted with two aryl substituents and at least two of which are bonded to sulfur.
9. The process of claim 8 wherein the ligand is 2-methyl-2-diphenylphosphinomethyl)-1,3-bis(diphenylphosphino)propane trisulfide.
10. The process of claim 8 wherein the ligand is represented by the formula

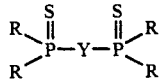

wherein each R is a phenyl and Y is a divalent linking group of up to 10 carbon atoms and up to 2 additional atoms, with from 1 to 4 atoms in the bridge.

11. The process of claim 10 wherein Y is 1,3-[2-methyl-2-(diphenylphosphinomethyl)]propylene.
12. The process of claim 10 wherein Y is 1,3-propylene.

13. The process of claim 10 wherein Y is 1,2-ethylene.

14. In the process of producing a linear alternating terpolymer of carbon monoxide, ethylene and propylene under polymerization conditions in the presence of a catalyst composition formed from palladium acetate, the anion of trifluoroacetic acid or p-toluenesulfonic acid and a bidentate phosphorus ligand, the improvement wherein the bidentate ligand is an aryl phosphine sulfide of from 2 to 3 phosphorus atoms, each of which is substituted with two phenyl substituents and at least two of which are bonded to sulfur.

* * * * *